(12) United States Patent
Kuznia et al.

(10) Patent No.: US 11,366,039 B2
(45) Date of Patent: *Jun. 21, 2022

(54) BIDIRECTIONAL COUPLING OPTIC

(71) Applicant: Ultra Communications, Inc., Vista, CA (US)

(72) Inventors: Charles B. Kuznia, Encinitas, CA (US); Joseph Farzin Ahadian, San Marcos, CA (US); Sandra Skendzic, Vista, CA (US)

(73) Assignee: ULTRA COMMUNICATIONS, INC., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,432

(22) Filed: Jan. 20, 2021

(65) Prior Publication Data
US 2021/0310898 A1   Oct. 7, 2021

Related U.S. Application Data

(63) Continuation of application No. 16/363,875, filed on Mar. 25, 2019, now Pat. No. 10,900,867.

(51) Int. Cl.
*G01M 11/00* (2006.01)
*H04B 10/071* (2013.01)
*G02B 6/42* (2006.01)

(52) U.S. Cl.
CPC ....... *G01M 11/3154* (2013.01); *G02B 6/4214* (2013.01); *H04B 10/071* (2013.01); *G02B 6/4246* (2013.01)

(58) Field of Classification Search
None
See application file for complete search history.

(56) References Cited

U.S. PATENT DOCUMENTS

| | | | | |
|---|---|---|---|---|
| 6,888,988 B2* | 5/2005 | Vancoille | | G02B 6/4227 385/47 |
| 8,283,678 B2* | 10/2012 | Morioka | | G02B 6/4214 385/47 |
| 9,910,230 B2* | 3/2018 | Zhang | | G02B 6/4286 |
| 10,184,785 B2* | 1/2019 | Morioka | | G02B 6/4246 |
| 10,900,867 B2* | 1/2021 | Kuznia | | G01M 11/3154 |
| 2020/0021081 A1* | 1/2020 | Liu | | H04B 10/504 |

* cited by examiner

*Primary Examiner* — Omar R Rojas
(74) *Attorney, Agent, or Firm* — Steinfl + Bruno LLP

(57) ABSTRACT

Methods and devices for coupling light bidirectionally into optical fiber are described. The disclosed devices can be manufactured inexpensively in one-piece and integrated in high speed optical transceivers with small form-factor. The described methods and devices enable OTDR functionality in such transceivers and are compatible with sensor components mounted on a wiring or circuit board.

19 Claims, 4 Drawing Sheets

BIDIRECTIONAL COUPLING OPTIC

CROSS REFERENCE TO RELATED APPLICATIONS—CLAIM OF PRIORITY

This application is a continuation of and claims the benefit of U.S. patent application Ser. No. 16/363,875 filed Mar. 25, 2019, and the contents of the patent application set forth above is hereby incorporated by reference as if set forth in full.

GOVERNMENT SUPPORT

This invention was made with government support under grant N00024-14-C-4060 awarded by the US Navy. The US government has certain rights in the invention.

TECHNICAL FIELD

The present disclosure relates to optical bidirectional coupling devices and methods for applying same. Embodiments in accordance with the present disclosure may be applied to couple light from a light source into a fiber for optical time domain reflectometer (OTDR) functionality integrated in low-cost package with small form-factor.

BACKGROUND

Fiber optics (a term synonymous with optical fibers) offers high data rate and electromagnetic interference immunity for high speed data communications. While being utilized for long distance links, fiber optics is now becoming prevalent in applications with short distance, for example within data centers, aircraft systems, and ship-board systems. These systems would benefit from optical time domain reflectometer (OTDR) with high resolution to determine the precise location of fiber faults, breaks, discontinuities, or configuration changes.

Optical transceivers are widely used in high speed data transmission using fiber optics. A typical example of such transceivers is the small form-factor pluggable (SFP) which is essentially a compact, hot-swappable connector that provides instant fiber connectivity for various networking gear. The form factor and electrical interface are specified by a multi-source agreement (MSA) under the auspices of the Small Form Factor Committee.

Due to the massive use of the optical transceivers in optical networks, it is highly desired, in some cases, to add the OTDR functionality to such transceivers. Such integration of the OTDR functionality should be cost-effective. As an example, the SFP optical modules are a commonly used type of transceivers and, to remain competitive, addition of any new feature such as OTDR to an SFP optical module requires to be inexpensive implementation. This imposes serious challenges to the design of the embedded OTDR systems. Moreover, the designed OTDR systems should be small enough to fit in the SFP mechanical housing. It is known in the art of telecommunication that the requirements related to the form-factor are stringent as imposed by the tight specifications from the MSA standard. A further design challenge of such OTDR systems is that the added functionality should not distract the data transmission and/or stop the transmission for a long period of time.

Most existing embedded OTDR systems are designed only for single-mode fiber where only one mode of light can pass (and not for multi-mode fiber where multiple modes of light can pass) and they often offer lower resolution, e.g. in the order of tens of meters. The other issue with the existing solutions is the implementation using multiple separate components with non-planar electrical interfaces are often more expensive and require larger space. Moreover, it is known that non-planar electrical interfaces are not suitable for applications where higher speed and less noisy data transmissions are required.

The existing systems may be used in fiber-to-the-home (FTTH) applications where the fiber path from a central office may be split into multiple paths to individual homes/blocks. Due to distances often larger than tens of meters, a low resolution OTDR system may suffice for the FTTH application. However, there are other applications wherein much higher resolutions are required. An example would be military ships where floating data centers are deployed. In such a system, fiber is run around the ship going back to data centers and the fiber length of interest may be smaller than ten meters in some cases. In this type of applications, debugging fiber breaks in smaller distances (e.g. down to centimeter range) is highly desired. This means that higher resolution OTDR systems (using pulse widths in the range of hundreds of picoseconds) should be implemented. Moreover, the personnel deployed on such ships are often not highly skilled in debugging fiber networks. This means that the integrated OTDR system should be plug-and-play and very easy to use.

Definition of Terms Used Throughout the Disclosure

Throughout the present disclosure, the term "low-speed photodetector" will be used to describe photodetectors designed to operate within the kHz range or lower. The term "high-speed photodetector" will be used to describe photodetectors designed to operate within the GHz range or higher. The term "high speed data communication" will be used to refer to data transmission or reception at Gbit/sec rate or higher.

SUMMARY

The disclosed methods and devices address the above-mentioned issues and provide solutions to the described design challenges and problems. The teachings of the present disclosure can be used to couple light bidirectionally into fiber, thereby enabling integration of OTDR functionality into high speed optical transceivers. Bidirectional coupling can also be used for bidirectional data communications over a single fiber. The disclosed devices can be manufactured inexpensively in large volume and can fit in the existing small form-factor of high speed optical transceivers such as SFP optical modules. Moreover, the disclosed devices can be built compactly in one piece and are compatible with components mounted on a board such as a planar wire board (PWB) or printed circuit board (PCB). The disclosed methods and devices can be used in high speed optical transmission applications with data rates of ten's of Gbit/sec where high resolution OTDR functionality is required. Furthermore, the teachings of the present disclosure can be applied to various fiber types, including, but not limited to, multi-mode fibers.

The following presents a simplified summary in order to provide a basic understanding of some aspects of the claimed subject matter. This summary is not an extensive overview, and is not intended to identify key/critical elements or to delineate the scope of the claimed subject matter.

Its purpose is to present some concepts in a simplified form as a prelude to the more detailed description that is presented later.

According to an aspect of the present disclosure, a method of coupling light through a coupling optic is described. The optic comprises a first lens, a first reflecting surface, a recess with a first recess side and a second recess side. The method comprises: coupling light into a coupling optic via the first lens to form coupled light; collimating, through the first lens, the coupled light to form collimated light; reflecting the collimated light by the first reflecting surface to form reflected light passing through the coupling optic; refracting the reflected light through the first recess side to form first refracted light outside the coupling optic, the first refracted light passing through an area external to the coupling optic, defined by the recess; and further refracting the first refracted light back into the coupling optic through the second recess side to form second refracted light passing through the coupling optic. The method may also comprise reflecting the first refracted light outside the coupling optic through the second recess side.

According to a further aspect of the present disclosure, a molded one-piece bidirectional coupling optic is described. The optic comprises: a transmit lens configured to couple a first light into the bidirectional coupling optic, a light source of the first light being external to the bidirectional coupling optic; a fiber lens configured to couple the first light into an optical fiber external to the bidirectional coupling optic; a receive lens configured to couple a second light coming from the optical fiber to a first photodetector external to the bidirectional coupling optic; a first cavity having a first reflecting surface; a second cavity having a second reflecting surface; and a recess having a first recess side and a second recess side; wherein: the first cavity, the second cavity and the recess are each molded into the bidirectional coupling optic; a combination of the first reflecting surface, and the first and the second recess sides is configured to channel the first light through a transmit light path extending from the transmit lens to the fiber lens; and a combination of the second recess side and the second reflecting surface is configured to channel the second light into the first photodetector.

Further aspects of the disclosure are shown in the specification, drawings and claims of the present application.

DETAILED DESCRIPTION

Figure 1:
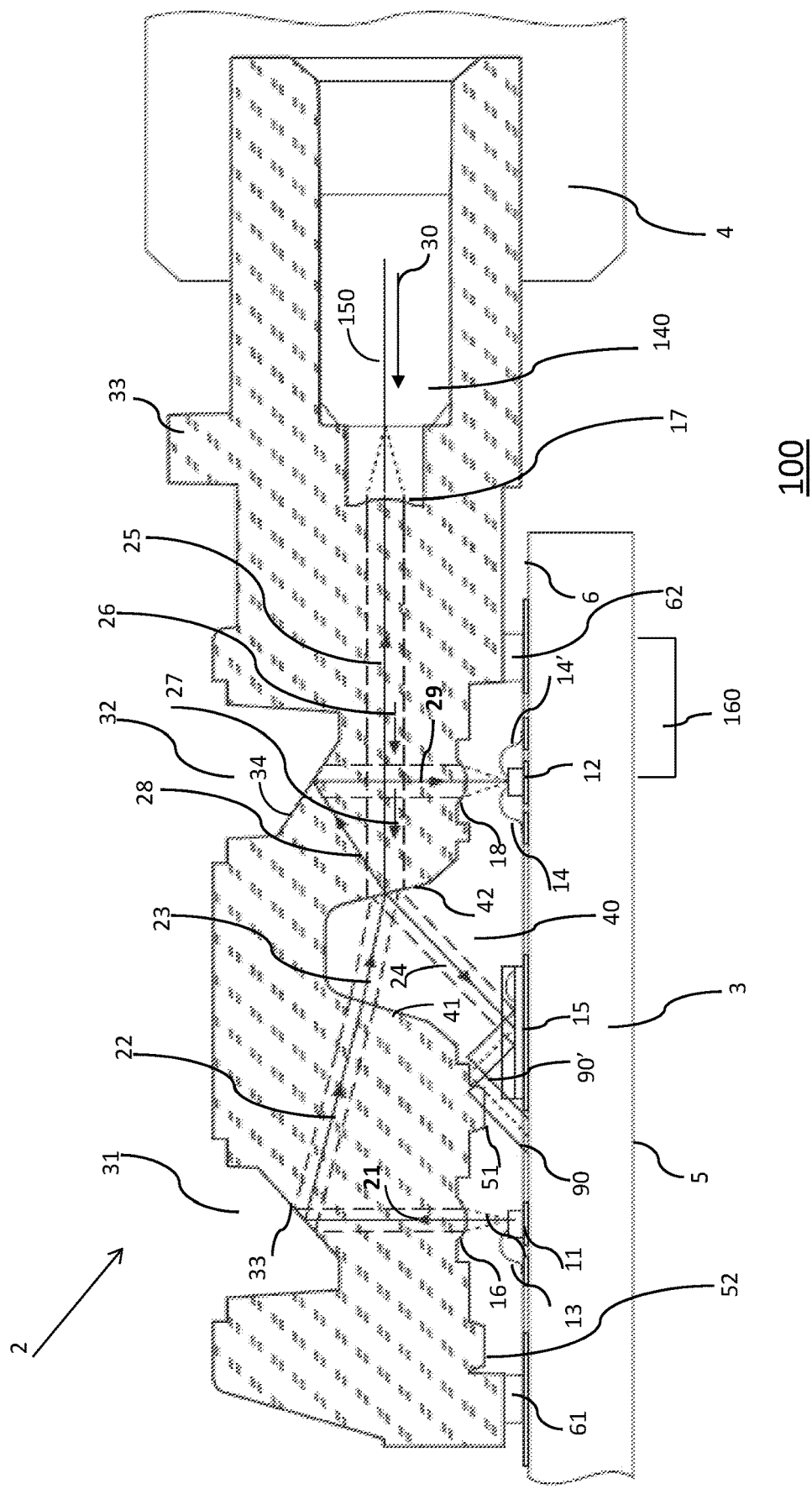
FIG. 1 shows a simplified cross-sectional view of a bidirectional coupling optic according to an embodiment of the present disclosure

FIG. 1 shows a simplified cross-sectional view of an optical system (100) according to an embodiment of the present disclosure.

The optical system (100) comprises a bidirectional coupling optic (2) designed to enable transmission and reception of light. The bidirectional coupling optic (2) comprises various features such as a transmit lens (16), a fiber lens (17), a receive lens (18), a first and a second reflecting surfaces (33, 34) and a recess (40) with a first recess side (41) and a second recess side (42) defining an area between them made of or comprising, e.g., air.

The optical system (100) further comprises a ferrule receptacle (140) inside which an optical fiber (150) may be inserted. Coupling may be performed by mating the ferrule receptacle (140) to an optical connector (4) such as an LC connector or alike. In accordance with an embodiment of the present disclosure, the first and second reflecting surfaces (33, 34) may be built by forming first and a second cavity regions (31, 32), respectively, into the bidirectional coupling optic (2).

The optical system (100) further comprises a printed circuit or wiring board acting as a support (3) having a support top side (6) and a support bottom side (5). Also shown in FIG. 1, are a light source such as a laser (11), e.g. a VCSEL (vertical cavity surface-emitting laser), a first photo-detector HSPD (12) and a second photo-detector PD (15) all mounted on the support top side (6). In the embodiment of FIG. 1, the first photo-detector is a high-speed photo-detector, while the second photo-detector can be high-speed or low-speed. According to embodiments of the present disclosure, the laser (11) and the HSPD (12) may be wire-bonded to the support (3) using wire-bonds (13, 14/14'), respectively.

In accordance with the teachings of the present disclosure, the optical system (100) may operate in transmit mode, receive mode or a combination thereof. In the transmit mode, the laser (11) is modulated by the high speed data and generates light accordingly.

In FIG. 1, various light paths within the bidirectional coupling optic (2) are shown by a combination of arrows surrounded by dashed-lines, the arrows indicating the direction of the traveling light. The light generated by the laser (11) travels upward as a cone of light striking the transmit lens (16) functioning essentially as a collimator. The collimated light enters then the bidirectional coupling optic (2), still traveling upward as indicated by the arrow (21), strikes the first reflecting surface (33), thereby generating the reflected light traveling now in the direction as indicated by the arrow (22), and before hitting the first recess side (41).

After striking the first recess side (41), the traveling light exits the bidirectional coupling optic (2), at a different angle, to hit the second recess side (42). The person skilled in the art will understand that the reason for the difference of the angles between the light paths indicated by the arrows (22, 23) is the difference between the refractive indices of the air and the material used to build the bidirectional coupling optic (2). After hitting the second recess side (42), a portion of the light may enter back into the bidirectional coupling optic (2), again at a different angle for the same reason mentioned before, to travel in the direction as indicated by the arrow (25) and to get focused and coupled into the optical fiber (150) via the fiber lens (17). The other portion of the light hitting the second recess side (42) may get reflected at the second recess side (42) to travel in the direction as indicated by the arrow (24), before hitting the PD (15). The person skilled in the art will appreciate that the portion of light travelled along the light path as indicated by the sequence of arrows (22, 23, 24) is received by the PD (15) and may be used for monitoring the laser power, and thereby used for adjusting the light intensity according to set requirements.

In the receive mode, light coming from the fiber, and in the direction as indicated by the arrow (30), enters the bidirectional coupling optic (2) via the fiber lens (17), and then travels in the direction as indicated by the arrows (26,

27). The traveling light then strikes the second recess side (42), reflects and travels in the direction as indicated by the arrow (28), hits the second reflecting surface (34), and reflects, travelling downward, as indicated by the arrow (29), before hitting the HSPD (12).

The person skilled in art will appreciate that, when operating in the receive mode, the source of the light coming from the optical fiber (150) into bidirectional coupling optic (2) is arbitrary and may be, for example, a neighboring optical module. As such, while in the receive mode, the laser (11) may not be required.

In view of what was described above, the optical system (100) may function as an OTDR. In this scenario, the laser (11) is modulated by the OTDR pulses instead of the high speed data. Generation of such OTDR pulses along with other control functions as required by the OTDR functionality, is performed using a control circuit (160) which may be disposed at the bottom side (5) of the PWB (3). The transmission of light and coupling into the fiber is similar to what was described above for the transmission mode. In other words, the transmission light path is as indicated by the sequence of arrows (21, 22, 23, 25). Light reflecting from an optical discontinuity or disruption in the optical fiber is received by the HSPD (12) following the same path and based on the same mechanism as described previously with regards to the receive mode. In other words, the receiving path is as indicated by the sequence of arrows (30, 26, 27, 28, 29). In accordance with embodiments of the present disclosure, OTDR pulse widths in the range of hundreds of picoseconds or less may be generated, thereby enabling high resolution OTDR functionality within the centimeter range.

In accordance with various embodiments of the present disclosure:

- the bidirectional coupling optic (2) may be made as a molded one-piece component,
- the bidirectional coupling optic (2) may be molded in a thermal-plastic material or any other optically transparent material,
- the laser (11) may be a vertical-cavity surface-emitting laser (VCSEL) laser, although other laser types may also be envisaged,
- the optical fiber (150) may be a multi-mode or a single-mode fiber,
- the bidirectional coupling optic (2) can fit in the housing of high speed optical transceivers with small form-factor. Examples of such optical transceivers include but are not limited to SFP and SFP+ optical modules. In other words, the bidirectional coupling optic (2) can be integrated with high speed optical transceivers running at tens of Gbit/sec data transmission rates,
- the bidirectional coupling optic (2) may be molded around the first and the second cavity regions (31, 32) using a standard injection molding process,
- the bidirectional coupling optic (2) may have a length of about 1 cm or shorter.

Still referring to FIG. 1, the bidirectional coupling optic (2) further comprises a collar (33) holding to the housing of an optical transceiver such as the SFP optical module within which the bidirectional coupling optic (2) is integrated.

Figure 2:
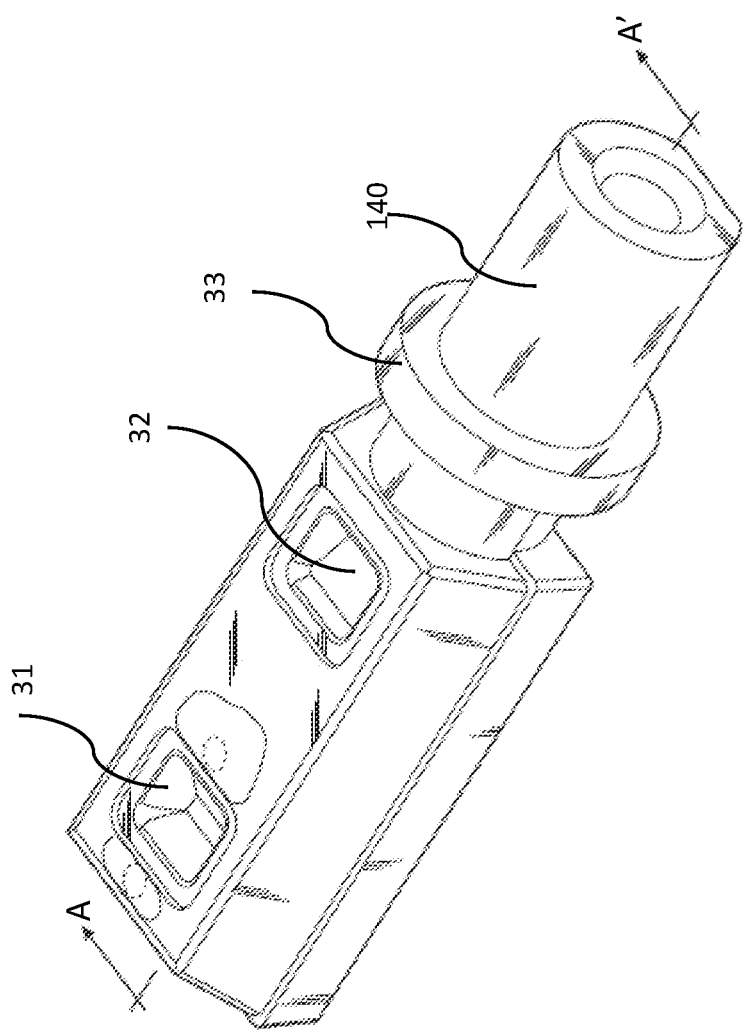
FIG. 2 shows a top perspective view of the embodiment shown in FIG. 1
Figure 3:
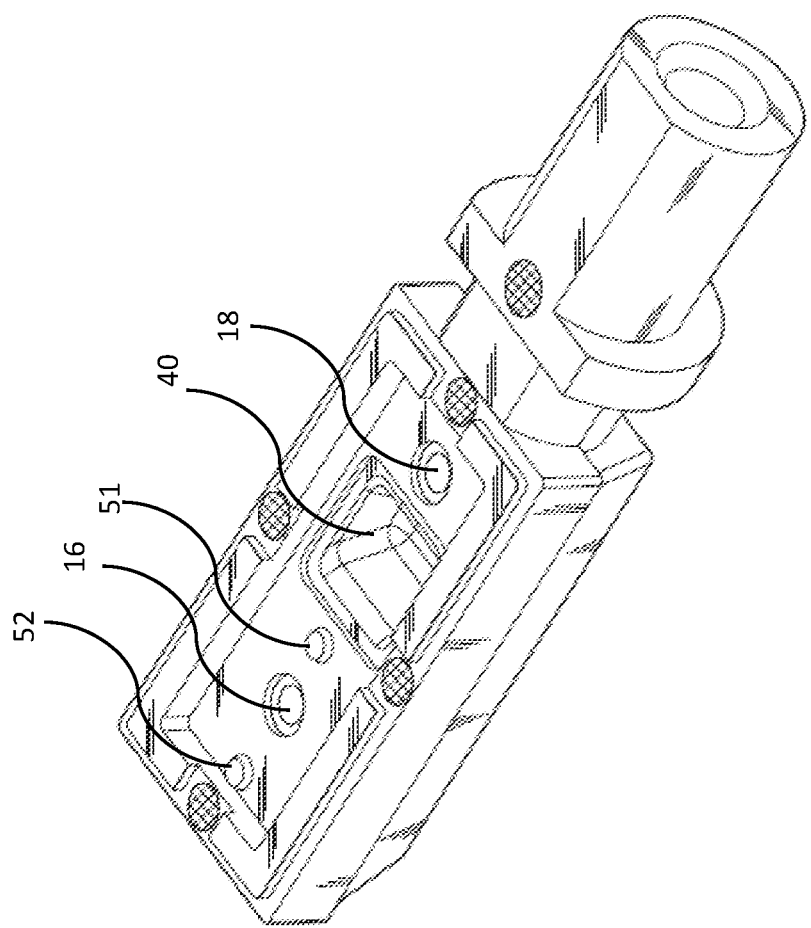
FIG. 3 shows a bottom perspective view of the embodiment shown in FIG. 1
Figure 4:
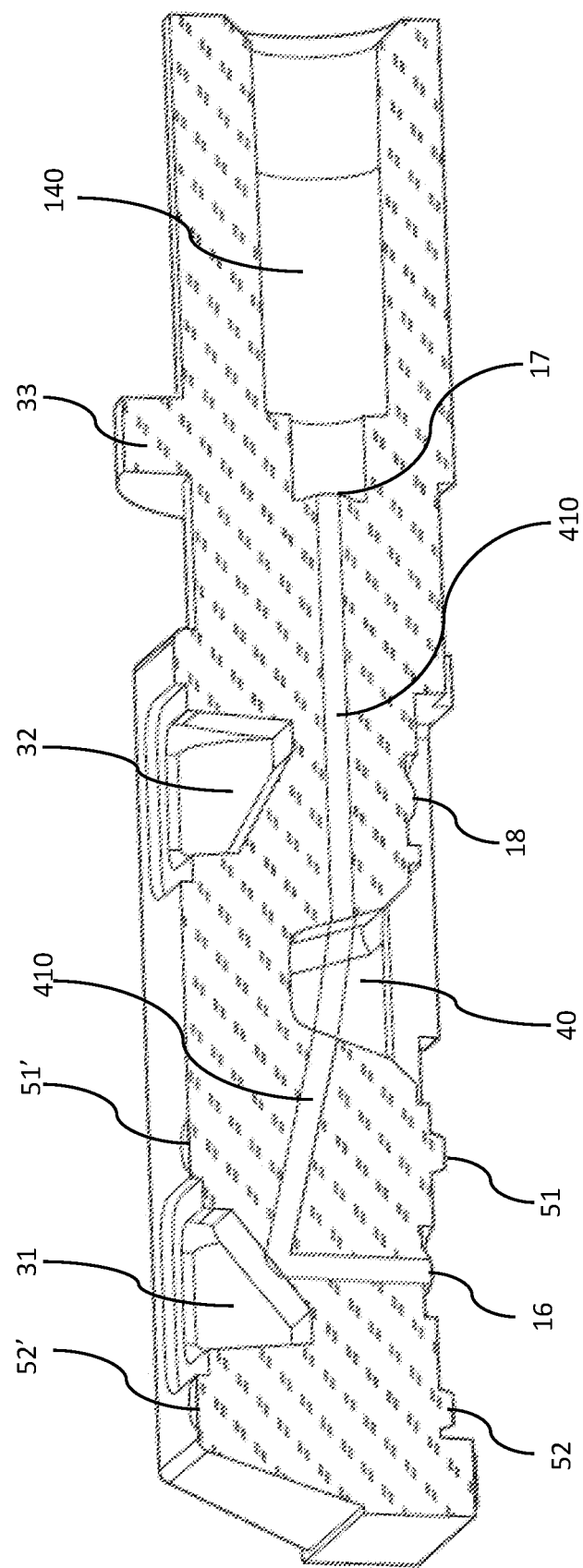
FIG. 4 show a cross section taken perpendicularly to line A-A' of the embodiment shown in FIG. 2.

FIGS. 2 and 3 show the perspective top and bottom view of the embodiment shown in FIG. 1. FIG. 4 shows a cross-section, perpendicularly to the axis A-A' of FIG. 2. Such cross section is essentially a 3D illustration of the embodiment shown in FIG. 1.

According to the teachings of the present disclosure, an active alignment may be used to couple light from the laser into the bidirectional coupling optic (2) and then into the fiber optic (150). Such alignment may be performed based on set requirements for the optical power coupled into the fiber. In an active alignment, the bidirectional coupling optic (2) is moved over the support or PWB (3) while the laser power is actively monitored using the PD (15). Once the measured laser power reaches a desired value, the bidirectional coupling optic (2) is glued to the chip and this is followed by a subsequent step of curing the glue. In such an active alignment the height of the bidirectional coupling optic (2) with respect to the PWB (3) can be adjusted. This is beneficial as it allows optimizing the coupling for various laser types having different performance parameters.

With reference back to FIG. 1, a different type of alignment at a fixed height can also be performed by simply placing the bidirectional coupling optic (2) on a first leg (61) and a second legs (62) on top of the PWB (3). Such an alignment may require more accurate design considerations including the choice of the laser type to make sure the coupling of the light from the laser (11) to the bidirectional coupling optic (2) is optimized. After proper alignment of bidirectional coupling optic (2) with the PWB (3), the bidirectional coupling optic (2) is bonded to the PWB (3).

With reference to FIGS. 1 and 4, the bidirectional coupling optic (2) further comprises first and a second alignment fiducials (51, 52) aligned with a first and a second polished alignment ports (51', 52') respectively. Such alignment features are used to implement an optimized alignment of the bidirectional coupling optic (2) with both the laser (11) and the optical fiber (150). A transmit light path (410) is also schematically shown in FIG. 4 as an empty white corridor. The transmit light path (410) is mainly shown to illustrate, consistently with was described with regards to FIG. 1, the transmission path previously indicated by the sequence of arrows (21, 22, 23, 25).

According to further embodiments of the present disclosure, various types of coating with different reflection coefficients may be applied to the first and second reflecting surfaces (33, 34) and the first and the second recess sides (41, 42). By way of example, and not of limitation, a 90%-100% reflection coating may be applied to the first and/or the second reflecting surfaces (33, 34) and the first and/or the second recess sides (41, 42) may each be applied a 40%-60%, e.g. 50%, reflection coating, meaning that half the light hitting any of the first and the second recess sides (41, 42) will pass through at a given angle and half of the light will be reflected at another angle. In such a scenario, traveling light coupled into the optical fiber (150) has approximately ¼th of the optical power of the light generated initially by the laser (11). This may be beneficial in the applications wherein the optical power coupled in the optical fiber (150) has to comply with minimum eye-safety requirements set by various optical standards. Based on such an example, the person skilled in the art will appreciate that one way to control the optical power coupled into the optical fiber (150) is to vary the coating of various reflecting features within the bidirectional coupling optic (2) to adjust the attenuation of the light path from the laser (11) to the optical fiber (150). The person skilled in the art will understand that the teaching of the present disclosure will allow a reflection percentage of the coating of at least one of the first reflecting surface (33), the second reflecting surface (34), the first recess side (41), or the second recess side (42) to be individually selectable.

Referring back to FIG. 1, and as illustrated by the optical rays (90, 90'), a portion of light traveling in the direction as indicated by the arrow (24) may bounce off the PD (15) and the body of the bidirectional coupling optic (2) before hitting the support top side (6). According to an embodiment of the present disclosure, the space between the laser (11) and the PD (15) may be designed so the bounced portion of light avoids striking the laser (11).

With continued reference to FIG. 1, the person skilled in the art will appreciate that design parameters such as various reflection and refraction angles of the transmit and received light, the spacing between various features within the bidirectional coupling optic (2), the inter-spacing of the Laser (11), the PD (15), and the HSPD (12) may vary from one design to another. Such parameters may vary depending on the refractive index of the material used to build the bidirectional coupling optic (2), and/or set requirements of, for example, the form-factor or the optical power coupled to the fiber, etc. The reflection and refraction angles of the first and second reflecting surfaces (33, 34) and the first and the second recess sides (41, 42) can be adjusted to accommodate the spacing of the features described above. An example of the range of angles for the first and second reflecting surfaces (33, 34) is between 20 degrees and 50 degrees (measured from horizontal). An example of the range of angles for the second recess sides (41, 42) is between 60 degrees and 85 degrees (measured from horizontal).

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A bidirectional coupling optic comprising:
a transmit lens configured to couple a first light into the bidirectional coupling optic, a light source of the first light being external to the bidirectional coupling optic;
a fiber lens configured to couple the first light into an optical fiber external to the bidirectional coupling optic;
a receive lens configured to couple a second light coming from the optical fiber to a first photodetector external to the bidirectional coupling optic;
a first cavity having a first reflecting surface;
a second cavity having a second reflecting surface; and
a recess having a first recess side and a second recess side, wherein:
a combination of the first reflecting surface, and the first and the second recess sides is configured to channel the first light through a transmit light path extending from the transmit lens to the fiber lens; and
a combination of the second recess side and the second reflecting surface is configured to channel the second light into the first photodetector.

2. The bidirectional coupling optic of claim 1, further configured to channel a portion of the first light into a second photodetector external to the bidirectional coupling optic.

3. The bidirectional coupling optic of claim 2, wherein a portion of the transmit light path is outside the bidirectional coupling optic.

4. The bidirectional coupling optic of claim 1 integrated within a housing of an optical transceiver with a form factor and electrical interface as specified by a standard defined by multi-source agreement (MSA).

5. The bidirectional coupling optic of claim 4, wherein the optical transceiver is a small formfactor (SFP) transceiver or an SFP+ transceiver.

6. The bidirectional coupling optic of claim 3, wherein at least one of the first reflecting surface, the second reflecting surface, the first recess side, or the second recess side comprise a coating.

7. The bidirectional coupling optic of claim 6, wherein a reflection percentage of the coating of the at least one of the first reflecting surface, the second reflecting surface, the first recess side, or the second recess side is individually selectable.

8. The bidirectional coupling optic of claim 6, wherein at least one of the first and second reflecting surfaces has a 90%-100% reflection coating.

9. The bidirectional coupling optic of claim 6, wherein at least one of the first and second recess sides has a 40%-60% reflection coating.

10. The bidirectional coupling optic of claim 1, wherein the optical transceiver is used either as a high speed data transmitter or an OTDR.

11. An OTDR comprising the bidirectional coupling optic of claim 1.

12. An optical coupling system comprising:
the bidirectional coupling optic of claim 2; and
a support external to the bidirectional coupling optic and aligned with the bidirectional coupling optic, the support comprising a light source for the first light, the first photodetector and the second photodetector.

13. The optical coupling system of claim 12, wherein the light source is a laser light source.

14. The optical coupling system of claim 12, wherein the first photodetector is a high-speed photodetector.

15. The optical coupling system of claim 12, wherein the light source, the first photodetector and the second photodetector are mounted on a same side of the support, facing the bidirectional coupling optic.

16. The optical coupling system of claim 12, further comprising an optical fiber coupled to the bidirectional coupling optic, wherein a light source of the second light is a portion of the first light reflected from the optical fiber.

17. The optical coupling system of claim 16, wherein the optical fiber is a multi-mode fiber.

18. The optical coupling system of claim 12, wherein the support further comprises a control circuit comprising electronic circuits to control the bidirectional coupling optic.

19. The optical coupling system of claim 13, wherein the support is a printed board, such as a planar wiring board or printed circuit board.

* * * * *